US010325629B1

(12) United States Patent
Cunico et al.

(10) Patent No.: US 10,325,629 B1
(45) Date of Patent: Jun. 18, 2019

(54) COGNITIVE SYSTEM AND METHOD FOR OPTIMIZED VIDEO PLAYBACK

(71) Applicant: International Business Machines Corporation, Armonk, NY (US)

(72) Inventors: Hernan A. Cunico, Holly Springs, NC (US); Liam S. Harpur, Skerries (IE); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/843,303

(22) Filed: Dec. 15, 2017

(51) Int. Cl.
| | |
|---|---|
| *H04N 9/80* | (2006.01) |
| *G11B 27/10* | (2006.01) |
| *H04N 9/87* | (2006.01) |
| *G10L 17/00* | (2013.01) |
| *G10L 25/57* | (2013.01) |
| *G10L 15/18* | (2013.01) |
| *G10L 25/63* | (2013.01) |
| *H04N 5/93* | (2006.01) |

(52) U.S. Cl.
CPC ........ *G11B 27/102* (2013.01); *G10L 15/1815* (2013.01); *G10L 17/005* (2013.01); *G10L 25/57* (2013.01); *G10L 25/63* (2013.01); *H04N 9/87* (2013.01)

(58) Field of Classification Search
CPC ...... G11B 27/102; H04N 9/87; G10L 17/005; G10L 25/57; G10L 25/63; G10L 15/1815
USPC ............... 386/262, 278, 291, 296, 343, 351
See application file for complete search history.

(56) References Cited

U.S. PATENT DOCUMENTS

| | | | |
|---|---|---|---|
| 2015/0347903 A1 | 12/2015 | Saxena et al. | |
| 2015/0373281 A1 | 12/2015 | White et al. | |
| 2016/0042281 A1* | 2/2016 | Cunico | ............... H04L 65/403 706/11 |
| 2018/0052851 A1* | 2/2018 | Lewis | ............... G06F 17/3053 |
| 2018/0167347 A1* | 6/2018 | Patierno | ............... H04L 51/10 |

* cited by examiner

*Primary Examiner* — Robert Chevalier
(74) *Attorney, Agent, or Firm* — Gates & Cooper LLP

(57) ABSTRACT

A cognitive system and method for optimized video playback. A semantic and sentiment analysis of the video presentation is performed to identify one or more topics, speakers, and sentiments therein. An analysis of at least one viewer is performed to identify the topics, speakers, and sentiments of interest. The topics, speakers, and sentiments are associated with a time-based mapping of the video presentation based on the analysis of the viewer. A navigation aid for the video presentation is generated using the time-based mapping, wherein the navigation aid includes entry and exit pointers to portions of the video presentation that match the viewer's areas of interest. Portions of the video presentation may be recommended and displayed to the viewer using the navigation aid.

20 Claims, 4 Drawing Sheets

COGNITIVE SYSTEM AND METHOD FOR OPTIMIZED VIDEO PLAYBACK

BACKGROUND

The present invention relates generally to a cognitive system and method for optimized video playback.

There are many times when a user only has an opportunity to attend a video presentation offline, after the video presentation has been recorded. Also, quite frequently, the user might be interested in viewing just a portion of that video presentation, for example, a portion presented on a particular topic or by a specific speaker. Moreover, depending on the sentiments expressed in the video presentation, and the emotional state of the viewer, there might be better times for watching certain portions of the video presentation.

Currently, the only way to find a specific portion of a pre-recorded video presentation is to have a direct pointer to the specific portion, or to fast-forward until the specific portion is found. However, neither of these options take into account the sentiment of the video presentation or the emotional state of the viewer.

Therefore, there is a need for a cognitive system and method to more efficiently position to a most appropriate section of a video presentation based on the viewer's interests and emotional state. The present invention satisfies that need.

SUMMARY

The invention provided herein has a number of embodiments useful, for example, in implementing a cognitive system and method for optimized video playback. Specifically, the computer-implemented system and method creates a navigation aid for playback of a video presentation.

A semantic and sentiment analysis of the video presentation is performed to identify one or more topics, speakers, and sentiments therein. The semantic and sentiment analysis of the video presentation creates an index to locations where the topics, speakers and sentiments of interest to the viewer are addressed in the video presentation.

An analysis of at least one viewer is performed to identify the topics, speakers, and sentiments of interest to the viewer. This may include analyzing a relationship between the viewer and the topics, speakers and sentiments in the video presentation. A continuous sentiment analysis of the viewer may be performed in order to continually update the navigation aid.

Quotients may be calculated for the identified topics, speakers and sentiments that reflect a relative interest of the viewer for the identified topics, speakers and sentiments. The quotients may be used to filter out those portions of the video presentation that have relatively lesser interest to the viewer, and the quotients may be used to create an index to those portions of the video presentation that have relatively greater interest to the viewer.

The topics, speakers, and sentiments are associated with a time-based mapping of the video presentation based on the analysis of the viewer. A navigation aid for the video presentation is generated using the time-based mapping. The navigation aid includes entry and exit pointers to portions of the video presentation that match the viewer's areas of interest, wherein the entry and exit pointers may vary depending on a time of the day and an emotional state of the viewer.

Portions of the video presentation may be recommended and displayed to the viewer using the navigation aid. This may include recommending and displaying portions of the video presentation in an optimal sequence based on the analysis of the viewer. In addition, this may include recommending and displaying portions of the video presentation at an optimal time based on the analysis of the viewer. This may also include displaying lengths for the portions of the video presentation.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Hardware and Software Environment

Figure 1:
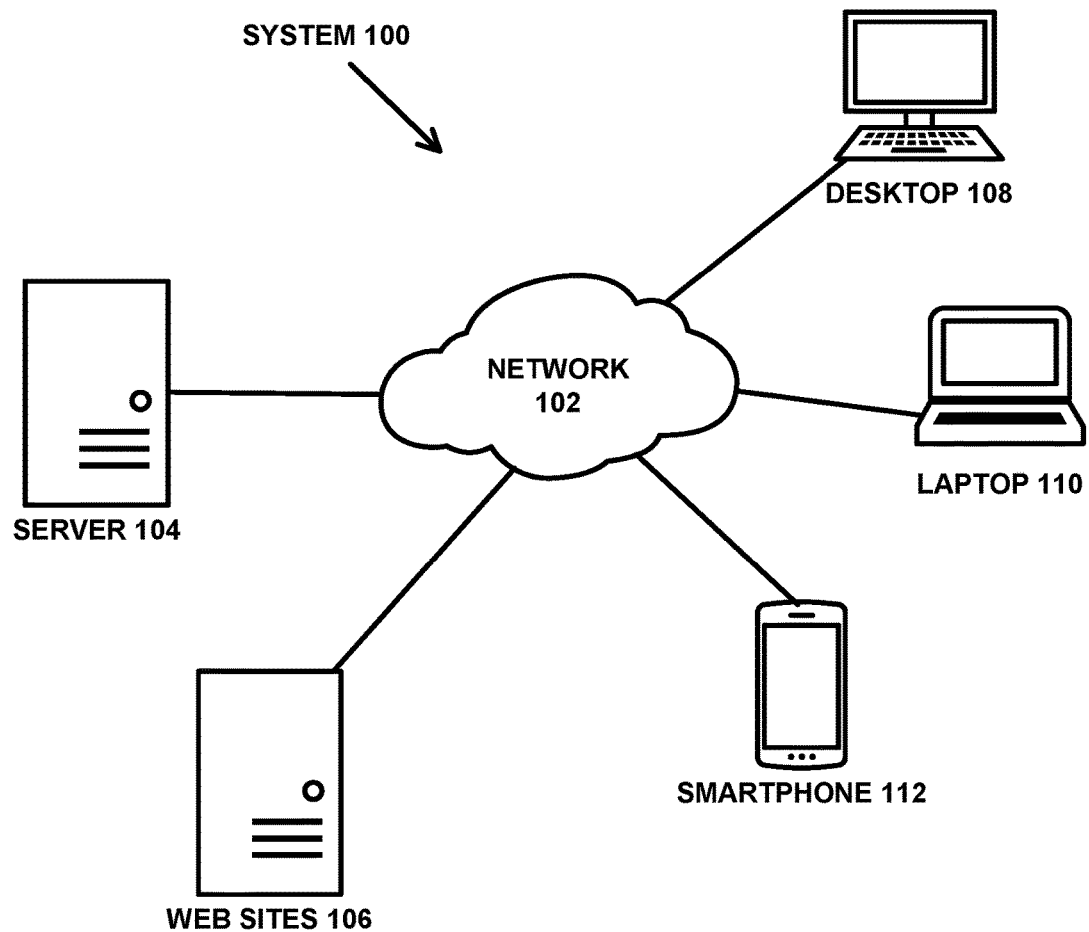
FIG. 1 is a pictorial representation of a computer-implemented cognitive system and method for optimized video playback, according to one embodiment.

FIG. 1 is a pictorial representation of a computer-implemented cognitive system and method for optimized video playback, according to one embodiment.

The system 100 includes a network 102, which is the medium used to provide communications links between various devices and computers connected together within the system 100. In the depicted example, the network 102 may be the Internet or another network.

A server computer 104 is connected to the network 102, along with one or more web sites 106 that include sources of video presentations. In addition, client devices 108, 110, 112 are connected to the server computer 104 and web sites 106 via the network 102. These client devices 108, 110, 112 may be, for example, desktop computers 108, laptop or notebook computers 110, smartphones 112, and other devices.

The server computer 104, web sites 106, and client devices 108, 110, 112, are typically comprised of one or more processors, random access memory (RAM), read-only memory (ROM), and other components such data storage devices and data communications devices. Moreover, the server computer 104, web sites 106, and client devices 108, 110, 112, execute one or more computer programs operating under the control of an operating system. These computer programs perform various functions and steps as described in more detail below.

In this invention, a user opts to view a video presentation, using one of the client devices 108, 110, 112 to access the video presentation from one of the web sites 106. This intention is communicated to the server 104, which also accesses the video presentation from one of the web sites 106. However, the user may be interested in viewing only a portion of that video presentation, for example, a portion on a particular topic or presented by a specific speaker. The server 104 analyzes the video presentation in order to identify the portions of the video presentation that may be of interest to the user.

Specifically, in analyzing the video presentation, the server 104 performs the following functions or steps:

1. Performing semantic analysis of the video presentation to identify the speakers, to obtain an understanding of the topics being discussed, and to identify where the speakers and the topics being discussed can be found in a timeline of the video presentation.
2. Performing sentiment analysis of the video presentation and associating that analysis to the timeline of the video presentation.
3. Analyzing the relationship between the viewer and the speakers.
4. Analyzing the relationship between the viewer and the topics being presented.
5. Performing a continuous sentiment analysis of the viewer.
6. Recommending and presenting to the viewer a navigation aid for the video presentation, highlighting the topics and speakers that have a relationship with the viewer, and suggesting how the video presentation should be viewed based on a comparison of the sentiment analysis of the view presentation and the emotional state of the viewer, e.g., when there is a match between the sentiments and the emotional state.

The creation of the navigation aid for the viewer that includes the following key aspects:

Applying a cognitive approach to understand what portions or snippets of a video presentation might be of most relevance to the viewer, and highlighting (or presenting) those portions to the viewer. For example, signifying to the viewer that there are three portions that may be of interest in the video presentation.

Recommending a proposed sequence for viewing the portions of the video presentation of most relevance to the viewer. For example, informing the user that the three portions that may be of interest should be watched sequentially or in some other order.

Recommending a proposed time for viewing the portions of the video presentation of most relevance to the viewer. For example, informing the user that the first two of the three portions that may be of interest should be watched sequentially, whereas a third portion can be viewed at a different time. This aspect, when combined with the other aspects, not only expedites access to the relevant portions, but also permits that access to occur at the most appropriate time in the viewer's day to match the viewer's emotional state.

Displaying the lengths of the portions of the video presentation of most relevance to the viewer. For example, signifying to the viewer that the three portions that may be of interest have the listed lengths.

There are a number of advantages to this invention. One advantage is that the system 100 provides the most efficient and effective way to consume only the important portions of the video presentation that are relevant to the viewer at the most appropriate time. Another advantage is that the system 100 can surface portions of the video presentation to match the emotional state of a viewer at a given time, for example, if the score of a portion of the video presentation ranks at 30% "relaxed" and matches the rank of the viewer, then that portion of the video presentation is made available to the viewer.

There are further enhancements that can be made to the invention. One enhancement is that sentiment analysis of the video presentation (or a portion of it) can be improved by analyzing the individual emotional responses of other viewers to the video presentation. This analysis not only considers the content of the video presentation itself, but also validates the responses from other viewers.

System Components

Figure 2:
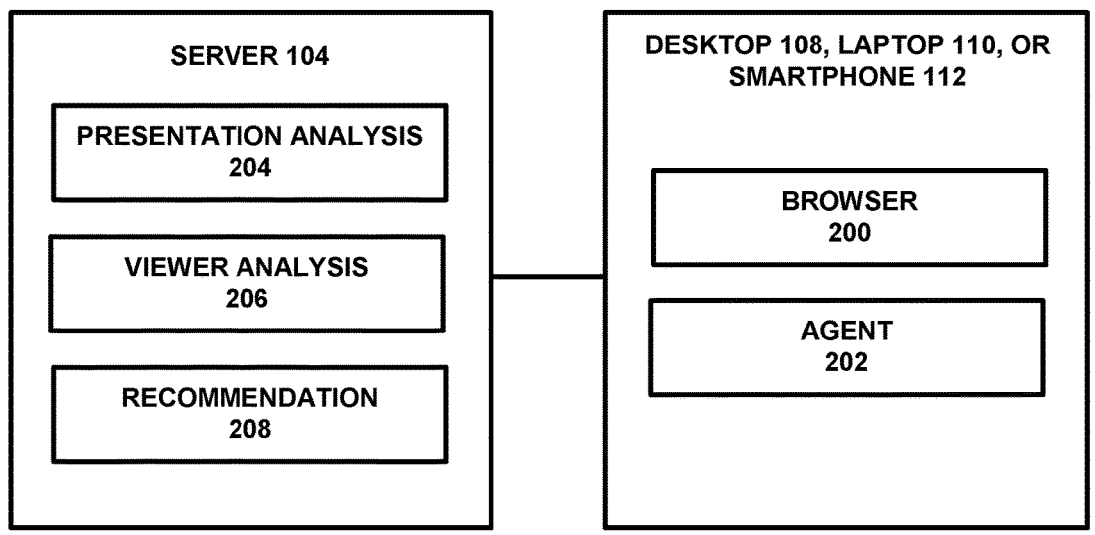
FIG. 2 is a block diagram illustrating how the cognitive system and method for optimized video playback is implemented, according to one embodiment.

FIG. 2 is a block diagram illustrating how the cognitive system and method for optimized video playback is implemented, according to one embodiment. In this embodiment, the optimized video playback is implemented by:

a browser 200 and an agent 202 executed on the user's devices 108, 110, 112, wherein the browser 200 is used to play the video presentation and the agent 202 is used to track the user's activities, behaviors, reactions, etc.; and a plurality of modules 204-208 executed on the server 104 that communicate with the browser 200 and agent 202 installed on the user's devices 108, 110, 112 to play the video presentation in the browser 200 and to analyze the user's activities, behaviors, reactions, etc., as tracked by the agent 202.

In alternative embodiments, however, these functions may be wholly performed on the server 104 or client devices 108, 110, 112.

To analyze both the video presentation and the user's activities, behaviors, reactions, etc., as tracked by the agent 202, the server 104 implements the following modules and functionality.

A Presentation Analysis module 204 performs semantic and sentiment analysis on the video presentation. The Presentation Analysis module 204 identifies topics, and creates an index to the locations where the topics are addressed in the video presentation; the Presentation Analysis module 204 identifies speakers, and creates an index to the locations where the speakers are talking in the video presentation; and Presentation Analysis module 204 identifies sentiments, and creates an index to the locations where the sentiments are expressed in the video presentation. The Presentation Analysis module 204 then creates a time-based mapping chart, i.e., an annotated timeline, using the indexes to the locations in the video presentation for the topics, speakers and sentiments.

A Viewer Analysis module 206 analyzes the viewer's affinity to the topics and speakers identified in the video presentation. The Viewer Analysis module 206 determines the viewer's interests towards certain topics and speakers by applying cognitive analysis to previous interactions (emails, chats, phone calls, threads, search histories, etc.) between the viewer and the topics and speakers identified in the video presentation. These interactions may be received from the client devices 108, 110, 112, as well as the web sites 106. Thereafter, the Viewer Analysis module 206 updates the timeline to highlight the topics and speakers of interest to the viewer.

This analysis of the viewer entails more than just looking at their history; the Viewer Analysis module 206 looks at the context of the previous interactions, what topics were discussed, the frequency of interactions, whether other people were involved, etc. This analysis includes (but is not limited to) semantic and sentiment analysis of previous or similar interactions between the viewer and the topics and speakers identified in the video presentation, wherein personal relationships may be considered along with role-based relationships. The Viewer Analysis module 206 also analyzes the viewer's social media subscriptions and interactions on the web sites 106 to identify the topics and speakers of interest to the viewer, for example, people being followed by the viewer. Further, the Viewer Analysis module 206 performs continuous sentiment analysis of the viewer in order to continually update the navigation aid.

The Presentation Analysis and Viewer Analysis modules 204, 206 generate a series of quotients that are calculated for the identified topics, speakers and sentiments. These quotients identify the relative interest of the viewer for the identified topics, speakers and sentiments.

A Recommendation module 208 uses the quotients generated by the Presentation Analysis module 204 and the Viewer Analysis module 206 to filter out portions of the video presentation that are of relatively lesser interest to the viewer. The Recommendation module 208 also uses the quotients to create an index with those portions of the video presentation that are of relatively greater interest to the viewer and their corresponding sentiment quotient.

With the index and the quotients from the Presentation Analysis module 204 and the Viewer Analysis module 206, the Recommendation module 208 creates a dynamic, viewer-specific, navigation aid from the timeline with entry and exit pointers to the portions of the video presentation that match the viewer's areas of interest. The pointers will vary depending on the time of the day and the emotional state of the viewer. Thereafter, the navigation aid may be downloaded to the client devices 108, 110, 112, or accessed directly by the client devices 108, 110, 112 on the server 104.

Use Case

Figure 3:
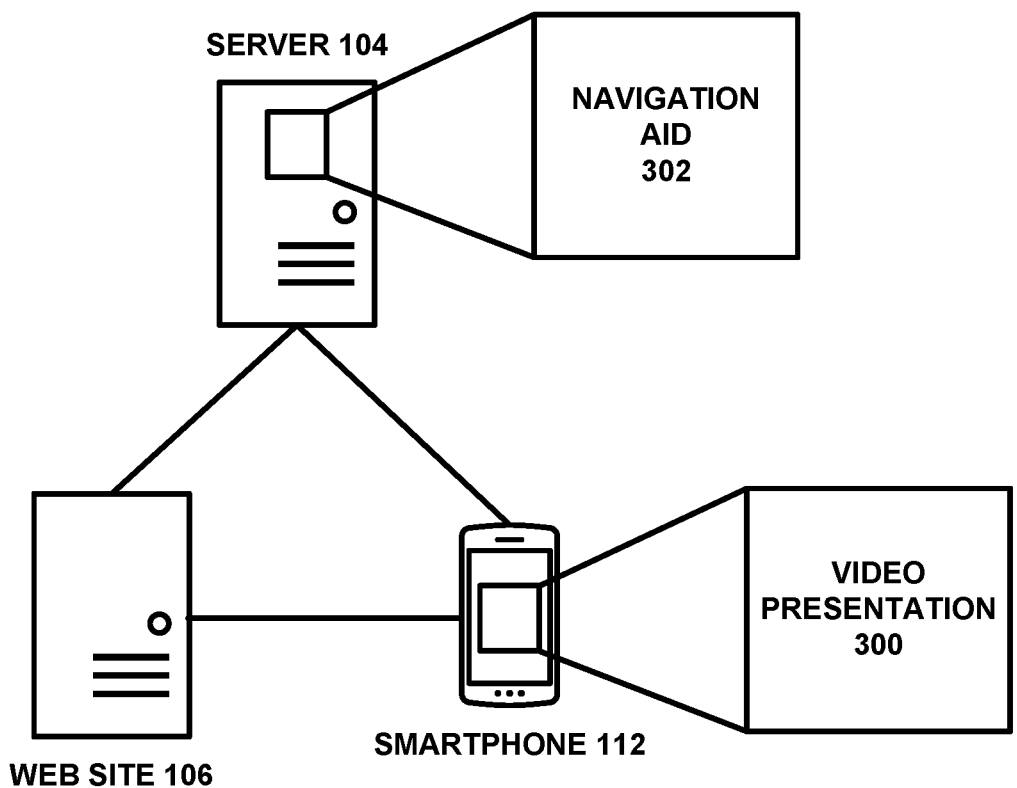
FIG. 3 illustrates a use case for the cognitive system and method for optimized video playback, according to one embodiment.

Consider the following use case illustrated in FIG. 3.

A viewer accesses a pre-recorded video presentation 300 on a web site 106 using their client devices 108, 110, 112. In this example, the video presentation 300 covers such topics as HTML (Hypertext Markup Language), which is the standard markup language for creating web pages and web applications; XML (eXtensible Markup Language), which is a markup language similar to HTML; JavaScript (JS), which is a lightweight interpreted or just-in-time compiled programming language used with web pages and web applications; CSS (Cascading Style Sheets), which is a stylesheet language used to describe the presentation of web pages written in HTML and XML; and AJAX (Asynchronous JavaScript And XML), which is used to communicate with web sites 106.

The Presentation Analysis module 204 performs semantic and sentiment analysis on the video presentation 300. Specifically, the Presentation Analysis module 204 identifies topics in the video presentation 300, and creates an index to the locations where the topics are addressed in the video presentation 300; the Presentation Analysis module 204 identifies speakers in the video presentation 300, and creates an index to the locations where the speakers are talking in the video presentation 300; and Presentation Analysis module 204 identifies sentiments in the video presentation 300, and creates an index to the locations where the sentiments are expressed in the video presentation 300. The Presentation Analysis module 204 then creates a time-based mapping chart using the indexes to the locations in the video presentation 300 for the topics, speakers and sentiments.

The Viewer Analysis module 206 analyzes the viewer's affinity to the topics, speakers and sentiments identified in the video presentation 300. In this use case, the viewer's particular interest is the topic of JavaScript. The Viewer Analysis module 206 determines this interest by applying cognitive analysis to the viewer's emails, chats, phone calls, threads, search histories, etc., which may have been received from the client devices 108, 110, 112, as well as the web sites 106.

The Presentation Analysis and Viewer Analysis modules 204, 206 generate a series of quotients that are calculated for the identified topics, speakers and sentiments. These quotients identify the relative interest of the viewer for the identified topics, speakers and sentiments. In this scenario, the quotient values are highest for the topic of JavaScript.

The Recommendation module 208 uses the quotients generated by the Presentation Analysis module 204 and the Viewer Analysis module 206 to filter out portions of the video presentation 300 that are of relatively lesser interest to the viewer, namely topics that are not directed to JavaScript. The Recommendation module 208 also creates an index with those portions of the video presentation 300 that are of relatively greater interest to the viewer, namely topics that are directed to JavaScript. With that index, the Recommendation module 208 creates a dynamic, viewer-specific, navigation aid 302 for the video presentation 300 from the timeline, thereby allowing the viewer to select the portions of the video presentation 300 that match the viewer's areas of interest, in this case, topics that are directed to JavaScript. The navigation aid 302 includes entry and exit pointers to the specific portions of the video presentation 300 directed to the topic of JavaScript.

The navigation aid 302 may be downloaded to the client devices 108, 110, 112, or accessed directly by the client devices 108, 110, 112 on the server 104.

Flowchart

Figure 4:
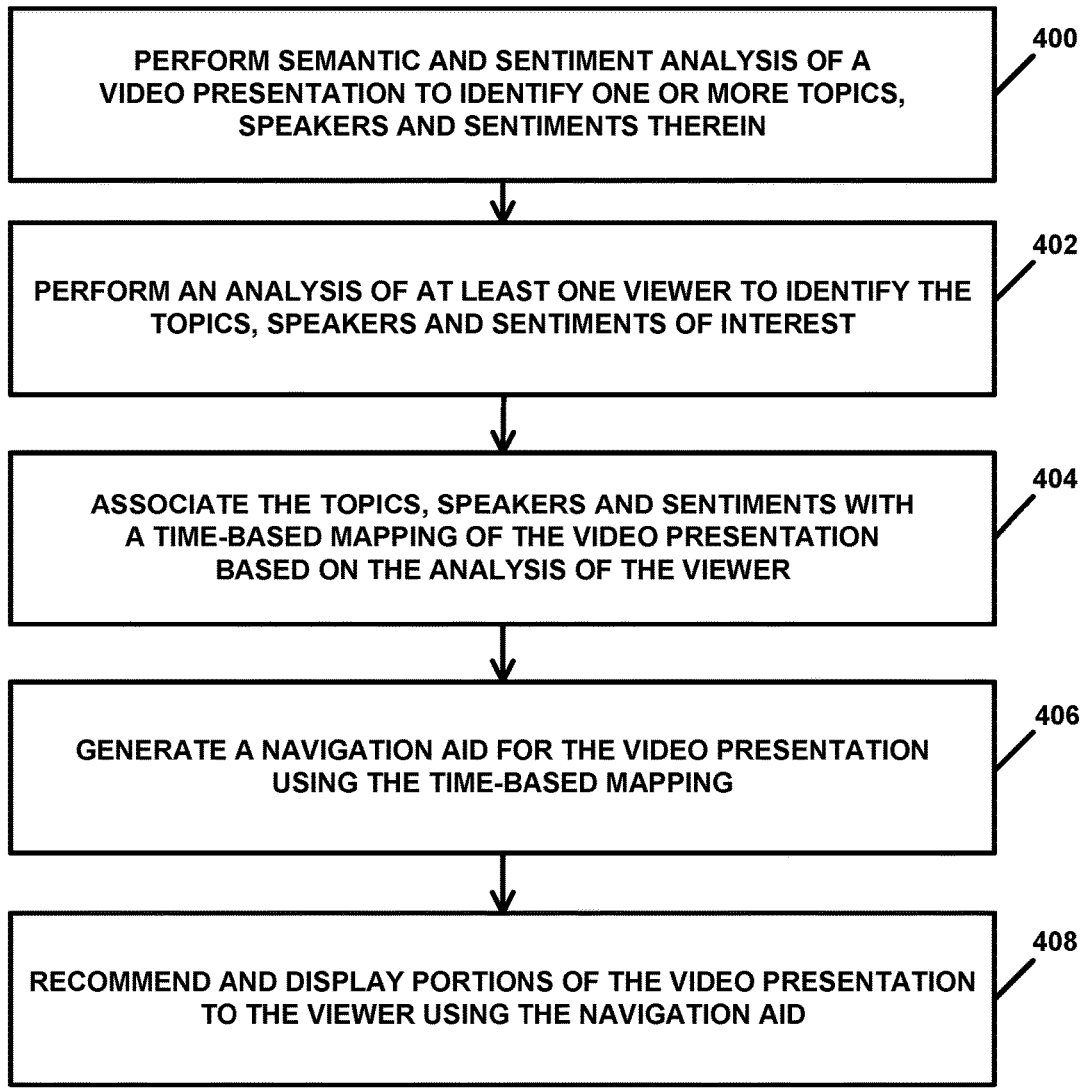
FIG. 4 is a flowchart illustrating the steps performed in the cognitive system and method for optimized video playback, according to one embodiment.

FIG. 4 is a flowchart illustrating the steps performed in the cognitive system and method for optimized video playback, according to one embodiment. Specifically, these steps comprise the system 100 creating a navigation aid for playback of a video presentation.

Block 400 represents the system 100 performing a semantic and sentiment analysis of the video presentation to identify one or more topics, speakers, and sentiments therein. The semantic and sentiment analysis of the video presentation creates an index to locations where the topics, speakers and sentiments of interest to the viewer are addressed in the video presentation.

Block 402 represents the system 100 performing an analysis of at least one viewer to identify the topics, speakers, and sentiments of interest to the viewer. This may include analyzing a relationship between the viewer and the topics, speakers and sentiments in the video presentation. This may also include calculating quotients for the identified topics, speakers and sentiments that reflect a relative interest of the viewer for the identified topics, speakers and sentiments, and then using the quotients to filter out those portions of the video presentation that have relatively lesser interest to the viewer, and using the quotients to create an index to those portions of the video presentation that have relatively greater interest to the viewer. In addition, this may include performing a continuous sentiment analysis of the viewer in order to continually update the navigation aid. In addition, this may include performing a continuous sentiment analysis of the viewer in order to continually update the navigation aid.

Block 404 represents the system 100 associating the topics, speakers, and sentiments with a time-based mapping of the video presentation based on the analysis of the viewer.

Block 406 represents the system 100 generating the navigation aid for the video presentation using the time-based mapping. The navigation aid includes entry and exit pointers to portions of the video presentation that match the viewer's areas of interest, wherein the entry and exit pointers may vary depending on a time of the day and an emotional state of the viewer.

Block 408 represents the system 100 recommending and displaying portions of the video presentation to the viewer using the navigation aid. This may include recommending and displaying portions of the video presentation in an optimal sequence based on the analysis of the viewer, recommending and displaying portions of the video presentation at an optimal time based on the analysis of the viewer, and displaying lengths for the portions of the video presentation.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented method, comprising:
   creating a navigation aid for playback of a video presentation, by:
      performing a semantic and sentiment analysis of the video presentation to identify one or more topics, speakers, and sentiments therein;
      performing an analysis of at least one viewer to identify the topics, speakers, and sentiments of interest to the viewer;
      associating the topics, speakers, and sentiments with a time-based mapping of the video presentation based on the analysis of the viewer; and
      generating the navigation aid for the video presentation using the time-based mapping, wherein the navigation aid is displayed for use during playback of the video presentation.

2. The method of claim 1, wherein the semantic and sentiment analysis of the video presentation creates an index to locations where the topics, speakers and sentiments of interest to the viewer are addressed in the video presentation.

3. The method of claim 1, further comprising recommending and displaying portions of the video presentation to the viewer using the navigation aid.

4. The method of claim 3, further comprising recommending and displaying portions of the video presentation in an optimal sequence based on the analysis of the viewer.

5. The method of claim 3, further comprising displaying lengths for the portions of the video presentation.

6. The method of claim 3, further comprising recommending and displaying portions of the video presentation at an optimal time based on the analysis of the viewer.

7. The method of claim 1, wherein the navigation aid includes entry and exit pointers to portions of the video presentation that match the viewer's areas of interest.

8. The method of claim 7, wherein the entry and exit pointers vary depending on a time of the day and an emotional state of the viewer.

9. The method of claim 1, further comprising calculating quotients for the identified topics, speakers and sentiments that reflect a relative interest of the viewer for the identified topics, speakers and sentiments.

10. The method of claim 9, further comprising using the quotients to filter out those portions of the video presentation that have relatively lesser interest to the viewer.

11. The method of claim 9, further comprising using the quotients to create an index to those portions of the video presentation that have relatively greater interest to the viewer.

12. The method of claim 1, wherein the step of performing an analysis of at least one viewer further comprises analyzing a relationship between the viewer and the topics, speakers and sentiments in the video presentation.

13. The method of claim 1, further comprising performing a continuous sentiment analysis of the viewer in order to continually update the navigation aid.

14. A computer-implemented system, comprising:
   one or more computers programmed for creating a navigation aid for playback of a video presentation, by:
      performing a semantic and sentiment analysis of the video presentation to identify one or more topics, speakers, and sentiments therein;
      performing an analysis of a viewer to identify the topics, speakers, and sentiments of interest to the viewer;
      associating the topics, speakers, and sentiments with a time-based mapping of the video presentation based on the analysis of the viewer; and
      generating the navigation aid for the video presentation using the time-based mapping, wherein the navigation aid is displayed for use during playback of the video presentation.

15. The system of claim 14, wherein the semantic and sentiment analysis of the video presentation creates an index to locations where the topics, speakers and sentiments of interest to the viewer are addressed in the video presentation.

16. The system of claim 14, further comprising recommending and displaying portions of the video presentation to the viewer using the navigation aid.

17. The system of claim 14, wherein the navigation aid includes entry and exit pointers to portions of the video presentation that match the viewer's areas of interest, and the entry and exit pointers vary depending on a time of the day and an emotional state of the viewer.

18. The system of claim 14, further comprising:
   calculating quotients for the identified topics, speakers and sentiments that reflect a relative interest of the viewer for the identified topics, speakers and sentiments;
   using the quotients to filter out those portions of the video presentation that have relatively lesser interest to the viewer; and
   using the quotients to create an index to those portions of the video presentation that have relatively greater interest to the viewer.

19. The system of claim 14, further comprising performing a continuous sentiment analysis of the viewer in order to continually update the navigation aid.

20. A computer program product, the computer program product comprising a non-transitory computer readable storage medium having program instructions embodied therewith, the program instructions executable by one or more computers to cause the computers to perform a method, comprising:
   creating a navigation aid for playback of a video presentation, by:

performing a semantic and sentiment analysis of the video presentation to identify one or more topics, speakers, and sentiments therein;

performing an analysis of a viewer to identify the topics, speakers, and sentiments of interest to the viewer;

associating the topics, speakers, and sentiments with a time-based mapping of the video presentation based on the analysis of the viewer; and generating the navigation aid for the video presentation using the time-based mapping, wherein the navigation aid is displayed for use during playback of the video presentation.

\* \* \* \* \*